United States Patent
Lawshae et al.

(10) Patent No.: US 10,878,088 B2
(45) Date of Patent: Dec. 29, 2020

(54) IDENTIFYING RANDOMLY GENERATED CHARACTER STRINGS

(71) Applicant: Trend Micro Incorporated, Tokyo (JP)

(72) Inventors: Richard Andrew Lawshae, Austin, TX (US); Josiah Dede Hagen, Austin, TX (US); Mathew Robert Powell, Austin, TX (US); Elvis Collado, Austin, TX (US); Jonathan Edward Andersson, Austin, TX (US); Stephen David Povolny, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 257 days.

(21) Appl. No.: 15/890,606

(22) Filed: Feb. 7, 2018

(65) Prior Publication Data
US 2018/0173875 A1    Jun. 21, 2018

Related U.S. Application Data

(63) Continuation of application No. PCT/US2015/045756, filed on Aug. 18, 2015.

(51) Int. Cl.
| | | |
|---|---|---|
| *G06F 21/56* | (2013.01) | |
| *G06F 21/55* | (2013.01) | |
| *H04L 29/06* | (2006.01) | |
| *G06F 21/60* | (2013.01) | |
| *H04L 12/26* | (2006.01) | |

(Continued)

(52) U.S. Cl.
CPC ............ *G06F 21/554* (2013.01); *G06F 21/56* (2013.01); *G06F 21/60* (2013.01); *G06F 40/279* (2020.01); *G06F 40/30* (2020.01); *G06F 40/53* (2020.01); *H04L 43/00* (2013.01);

(Continued)

(58) Field of Classification Search
None
See application file for complete search history.

(56) References Cited

U.S. PATENT DOCUMENTS 5,276,741 A * 1/1994 Aragon ..................... G06F 7/02
                                                             382/229
5,761,687 A * 6/1998 Hon ....................... G06F 40/232
                                                             715/271

(Continued)

FOREIGN PATENT DOCUMENTS

KR    10-2015-0083627 A    7/2015

OTHER PUBLICATIONS

Tracking and Characterizing Botnets Using Automatically Generated Domains. Schiavoni et al. (Year: 2013).*

(Continued)

*Primary Examiner* — Venkat Perungavoor
(74) *Attorney, Agent, or Firm* — Okamoto & Benedicto LLP

(57) ABSTRACT

Examples relate to identifying randomly generated character strings. In one example, a computing device may: receive a character string that includes two or more characters; identify a number of character transitions included in the character string, each character transition being a change in character type within an n-gram of the character string, where n is a positive integer; and determine, based on the number of character transitions, whether the character string was randomly generated.

7 Claims, 3 Drawing Sheets

(51) Int. Cl.
*G06F 40/30* (2020.01)
*G06F 40/53* (2020.01)
*G06F 40/279* (2020.01)
*G06F 21/46* (2013.01)

(52) U.S. Cl.
CPC .......... *H04L 63/1425* (2013.01); *H04L 69/22* (2013.01); *G06F 2221/033* (2013.01)

(56) References Cited

U.S. PATENT DOCUMENTS

| | | | | |
|---|---|---|---|---|
| 5,850,448 | A * | 12/1998 | Ganesan | G06F 21/31 713/184 |
| 8,260,914 | B1 * | 9/2012 | Ranjan | H04L 61/1511 709/224 |
| 8,909,628 | B1 * | 12/2014 | Kwok | G06F 16/951 707/723 |
| 9,043,894 | B1 * | 5/2015 | Dennison | H04L 63/1408 726/11 |
| 2006/0195309 | A1 * | 8/2006 | Stokkan | G06N 5/04 703/17 |
| 2008/0091630 | A1 * | 4/2008 | Bonissone | G06K 9/6284 706/45 |
| 2008/0270833 | A1 | 10/2008 | McMillen | |
| 2011/0167493 | A1 * | 7/2011 | Song | H04L 63/1416 726/23 |
| 2011/0219449 | A1 | 9/2011 | St. Neitzel et al. | |
| 2013/0291109 | A1 | 10/2013 | Staniford et al. | |
| 2014/0101764 | A1 | 4/2014 | Montoro | |
| 2016/0294852 | A1 * | 10/2016 | Hagen | H04L 63/1425 |
| 2016/0352679 | A1 * | 12/2016 | Hagen | H04L 61/1511 |

OTHER PUBLICATIONS

DGA Botnet detection using Collaborative Filtering and Density-based Clustering. Nguyen et al. ACM. (Year: 2015).*
Name Server Switching: Anomaly Signatures, Usage, Clustering and Prediction. Mohaisen et al. (Year: 2014).*
Malicious Automatically Generated Domain Name Detection Using Stateful-SBB. Haddadi et al, LNCS. (Year: 2013).*

* cited by examiner

US 10,878,088 B2

IDENTIFYING RANDOMLY GENERATED CHARACTER STRINGS

CROSS-REFERENCE TO RELATED APPLICATION

This application is a continuation of International Application No. PCT/US2015/045756, with an International Filing Date of Aug. 18, 2015, which is incorporated herein by reference in its entirety.

BACKGROUND

Computer networks and the devices that operate on them often experience problems for a variety of reasons, e.g., due to misconfiguration, software bugs, and malicious network and computing device attacks. Detecting and preventing the use and spreading of malicious software, for example, is often a priority for computer network administrators. Malicious software is increasingly designed to avoid detection using increasingly sophisticated methods.

BRIEF DESCRIPTION OF THE DRAWINGS

The following detailed description references the drawings, wherein.

DETAILED DESCRIPTION

Figure 1:
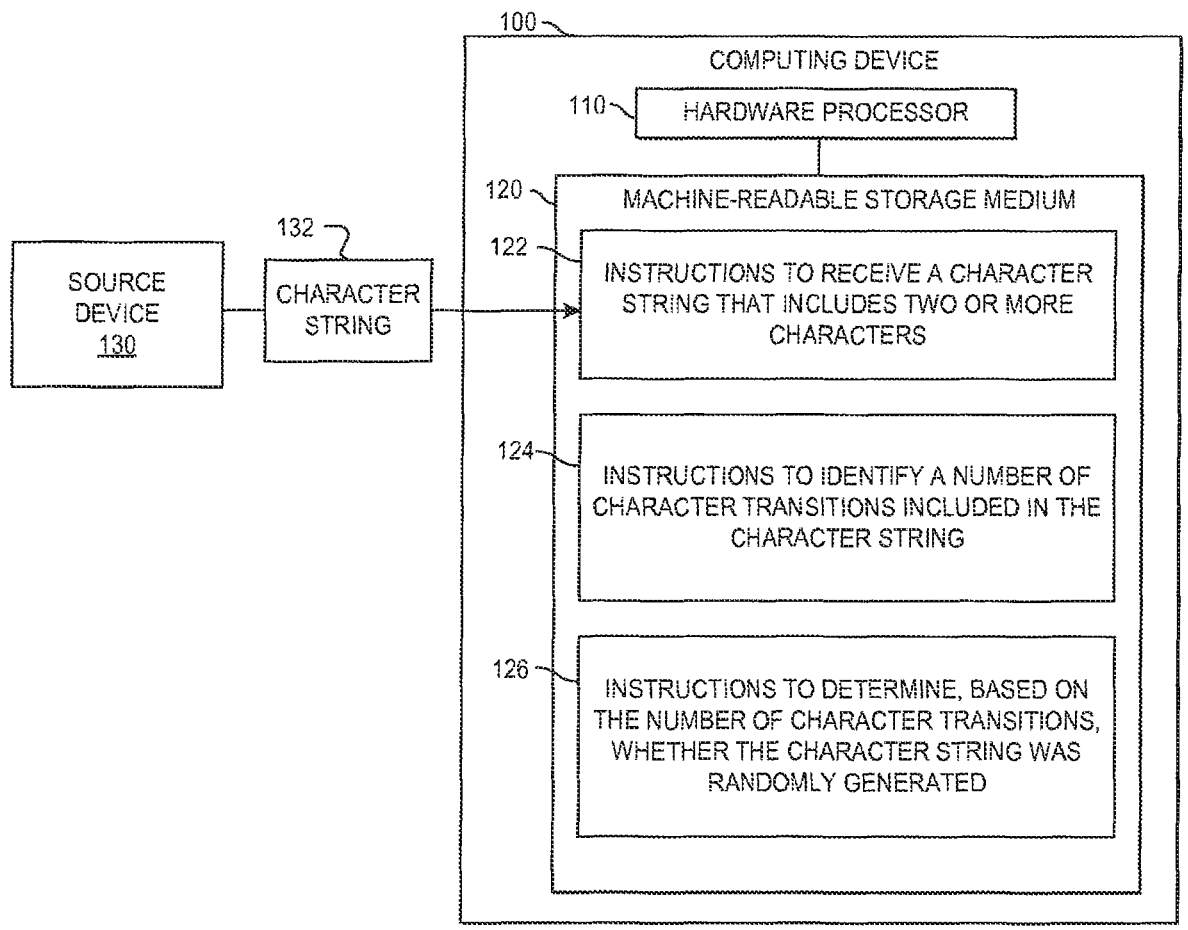
FIG. 1 is a block diagram of an example computing device for identifying randomly generated character strings.

The ability to determine whether a string is randomly generated may facilitate the identification of potentially malicious activity. Malicious software ("malware") often uses randomly generated character strings to avoid detection, e.g., to prevent security software from identifying the malware by searching fixed strings. Malware may randomly generate strings for use in a variety of contexts, for example, filenames, domain names, variable names, function names, host names, security certificate metadata, HTTP header metadata, electronic mail metadata, cascading style sheets metadata, and/or executable headers, to name a few.

By way of example, malware may make use of a domain generation algorithm (DGA) to periodically generate domain names that can be used by command and control servers to provide infected computing devices with updates and/or commands. Malware makes use of DGAs, as opposed to static domains, to prevent the malware command and control servers from being blacklisted. An infected computing device may periodically attempt to reach out to a large number of randomly generated domain names, only a portion of which are registered to malware command and control servers. A network administrator's ability to detect a computing device that is using a DGA to generate a large number of randomly generated domain names may facilitate the identification of infected computing devices on the administrator's network.

In some situations, a randomly generated string may be identified by identifying character transitions within the string and comparing the number of character transitions to a threshold number of character transitions. A character transition may be a change from one type of character to another, such as a change from a lower case letter to an upper case letter, or a digit to a punctuation mark, or a symbol to a foreign language character, to name a few. Character transitions may be identified, for example, by reviewing n-grams of a particular string of characters. By way of example, a random string detection device may review bigrams of strings to determine how many character transitions are included in the string. Analyzing an example string, "abc123," using bigrams would result in reviewing the character bigrams: [ab, bc, c1, 12, 23], one of which—"c1"—includes a character transition from the lower case letter, "c," to the digit, "1." In a situation where a threshold number of character transitions is 4, the string "abc123" would not meet the threshold to be identified as a randomly generated string. The string, "H5sdM2," on the other hand, has 4 character transitions: [H5, 5s, dM, M2] which, in this example, would be identified as a randomly generated string.

The manner in which randomly generated character strings are identified may vary, e.g., what qualifies as a character transition, the threshold used, and actions performed in response to positively identifying a randomly generated string. Character transitions, thresholds, and the manner in which randomly generated strings are handled may depend, for example, upon the context of the string. For example, the manner in which a randomly generated domain name is identified may vary from the manner in which a software code variable name is identified. Further details regarding the identification of randomly generated character strings are described in the paragraphs that follow.

Referring now to the drawings, FIG. 1 is a block diagram of an example computing device 100 for identifying randomly generated character strings. Computing device 100 may be, for example, a server computer, a personal computer, an intermediary network device, a mobile computing device, or any other electronic device suitable for processing data. In the embodiment of FIG. 1, computing device 100 includes hardware processor 110 and machine-readable storage medium 120.

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-126, to control the process for identifying randomly generated character strings. As an alternative or in addition to retrieving and executing instructions, hardware processor 110 may include one or more electronic circuits that include electronic components for performing the functionality of one or more instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-126, for identifying randomly generated character strings.

As shown in FIG. 1, the computing device 100 executes instructions 122 to receive a character string 132 that includes two or more characters. In this example, the character string 132 is provided by a source device 130. The source device 130 may be one of a variety of devices, such as a client computing device, a server computing device, or an intermediary network device, such as a router, switch, or load balancing device. While only a single source device 130 and character string 132 are shown, in some implementations the computing device 100 may receive multiple character strings from any number of source devices.

By way of example, the character string 132 may be a filename included in a network packet that includes a portion of the corresponding file, e.g., a file being transferred across a network. The source device 130 may be a network router that passes the network packet, which includes the character string 132, to the computing device 100 for analysis.

The computing device 100 executes instructions 124 to identify a number of character transitions included in the character string 132. Each character transition is a change in character type within an n-gram of the character string, where n is a positive integer. For example, the computing device may determine how many changes in character type occur in the string, "ExampleString1," by counting the bigrams that include characters of two different types.

In some implementations, each character is associated with a character types, which may be, for example, a lower case alphabetical character, upper case alphabetical character, numerical digit, punctuation mark, symbol, foreign language character, or non-printable character. Counting the bigrams that include a character transition from the foregoing list, "ExampleString1" includes four character transitions: "Ex," "e5," "St," and "g1."

In some implementations, each character transition is identified based on a match of characters included in a particular n-gram with a regular expression that specifies the character transitions. For example, a regular expression for detecting character transitions from upper case alphabetical characters to lower case alphabetical characters would pair each lower case character with each upper case character, e.g., "Aa, Ab, Ac . . . Zx, Zy, Zz." Any bigram in a test string that matches the any of the foregoing bigrams can be counted as a character transition from upper to lower case.

In some implementations, a custom set of n-grams may be used to identify the n-grams as character transitions, e.g., in situations where they would otherwise not normally be considered as such. For example, a set of non-English bigrams—letter pairs that do not occur together in the English language—may be used and considered as character transitions. For example, the following is an example set of bigrams that do not occur together within a single English word: bk, bq, bx, cb, cf, cg, cj, cp, cv, cw, cx, dx, fk, fq, fv, fx, fz, gq, gv, gx, hk, hv, hx, hz, iy, jb, jc, jd, jf, jg, jh, jk, jl, jm, jn, jp, jq, jr, js, jt, jv, jw, jx, jy, jz, kq, kv, kx, kz, lq, lx, mg, mj, mq, mx, mz, pq, pv, px, qb, qc, qd, qe, qf, qg, qh, qj, qk, ql, qm, qn, qo, qp, qr, qs, qt, qv, qw, qx, qy, qz, sx, sz, tq, tx, vb, vc, vd, vf, vg, vh, A, vk, vm, vn, vp, vq, vt, vw, vx, vz, wq, wv, wx, wz, xb, xg, xj, xk, xv, xz, yq, yv, yz, zb, zc, zg, zh, zj, zn, zq, zr, zs, zx. While each of the foregoing bigrams are pairs of lower case letters, in some implementations these character pairs may be considered character transitions. Other types of custom n-grams may be used for matching particular n-grams and treating them as character transitions.

Regular expressions may be used to manage which types of character transitions will be counted as such. For some types of strings, different types of transitions may be more useful, or less useful, to count. For example, some naming conventions for variables and functions in software code call for capitalizing each new word of a variable or function, e.g., "exampleStringVariableName." Accordingly, when examining software code variable names and/or function names, the computing device 100 may not want to count transitions from lower case to upper case, or upper case to lower case, as they are expected. In this situation, trigram regular expressions may be used, instead of or in addition to bigram regular expressions, for identifying character transitions. Example trigrams for identifying character transitions in variable names may be, for example, "aAA, aAB, aAC . . . zZX, zZY, zZZ." The foregoing example trigrams would identify character transitions when a lower case letter is followed by two upper case letters, which may not be used for some variable or function naming conventions. Many other types of character transitions may be identified and counted, or ignored, based on a variety of combinations of character types within regular expressions.

In some implementations, the computing device 100 identifies a context associated with each character string, and the changes in character type that are counted as a character transition may depend on the context. The context of a character string may include a variety of information about the string, such as the manner in which it was received, the length of the string, and what the string represents. As noted above, in the context of software code variable and function names, certain changes in character types may not be counted as character transitions. As another example, a universal resource locator (URL) string may include many standard symbols and punctuation marks, such as colons, forward slashes, hashtags, and periods, which may be excluded from regular expressions designed to match character transitions in URLs.

The computing device 100 executes instructions 126 to determine, based on the number of character transitions, whether the character string 132 was randomly generated. For example, the computing device 100 may compare the number of character transitions to a threshold number of character transitions. In situations where the number of transitions meets the threshold, the character string may be identified as randomly generated. In situations where the number of transitions does not meet the threshold, the character string may not be identified as randomly generated.

In some implementations, the threshold number of character transitions may depend upon the context of the character string. For example, longer strings may have a higher threshold than shorter strings, file name strings may have a higher threshold than domain name strings, and strings obtained from a trusted source device may have a higher threshold than strings obtained from an untrusted or unknown source device. The thresholds may, in some implementations, be set according to user preferences, e.g., by an administrator, and/or machine-learned using previous examples of positive and negative random string determinations.

In some implementations, different types of character transitions may be counted differently. For example, lower case to upper case character transitions may count for half of a full transition, e.g., depending on the context. As another example, a trigram that includes three different character types may count as more character transitions than a trigram that has the same number of actual character transitions, but includes only two different character types. In some implementations, each different type of character transition may be associated with a weight, and a threshold score may be used for determining whether a character transition has occurred. Other variations and combinations on the example methods described above for counting character transitions may also be used to determine character transition thresholds and/or character transition counts, e.g., depending on the context and/or character types included in the transition.

The manner in which the computing device 100 handles positive and negative determines of randomly generated strings may vary. In some implementations, the computing device 100 executes instructions to produce a security event notification in response to positively identifying a string as randomly generated. For example, in a situation where the computing device 100 is an intermediary network device operating as part of a network intrusion prevention system, a positive identification of a randomly generated string in a network packet passing through the computing device may be indicative of malware operating on the source device. A security event notification may be provided to a security event handler to take action on the event. As another example, the computing device 100 may operate out-of-line, e.g., as an analytical device that analyzes data in parallel or previously captured. A positive identification of a randomly generated string may result in logging the positive identification and/or producing a security event notification.

As with the determination of whether or not a string is randomly generated, the action performed in response to a positive or negative identification of a randomly generated string may depend on the context. For example, in a content delivery network, packets including URLs with randomly generated strings may be expected, and positively identifying randomly generated URLs may not trigger a security event notification. As another example, positive identification of a randomly generated string in obfuscated code of a webpage may be indicative of potentially malicious software, triggering the computing device 100 to generate a security notification.

While FIG. 1 depicts a single computing device 100, single source device 130, and single character string 132, in some situations multiple computing devices and source devices may exist, with many character strings passing between them. For example, multiple computing devices may be implemented as in-line network intrusion detection devices through which network packets flow, and the computing device quickly analyzes the strings included in network packets received from a variety of sources before forwarding the packets to their intended destination. As another example, one or more computing devices may be used as analytical devices provided strings, in network packets or otherwise, for analysis and random string detection. A system including a combination of the foregoing device implementations may also be used.

Figure 2:
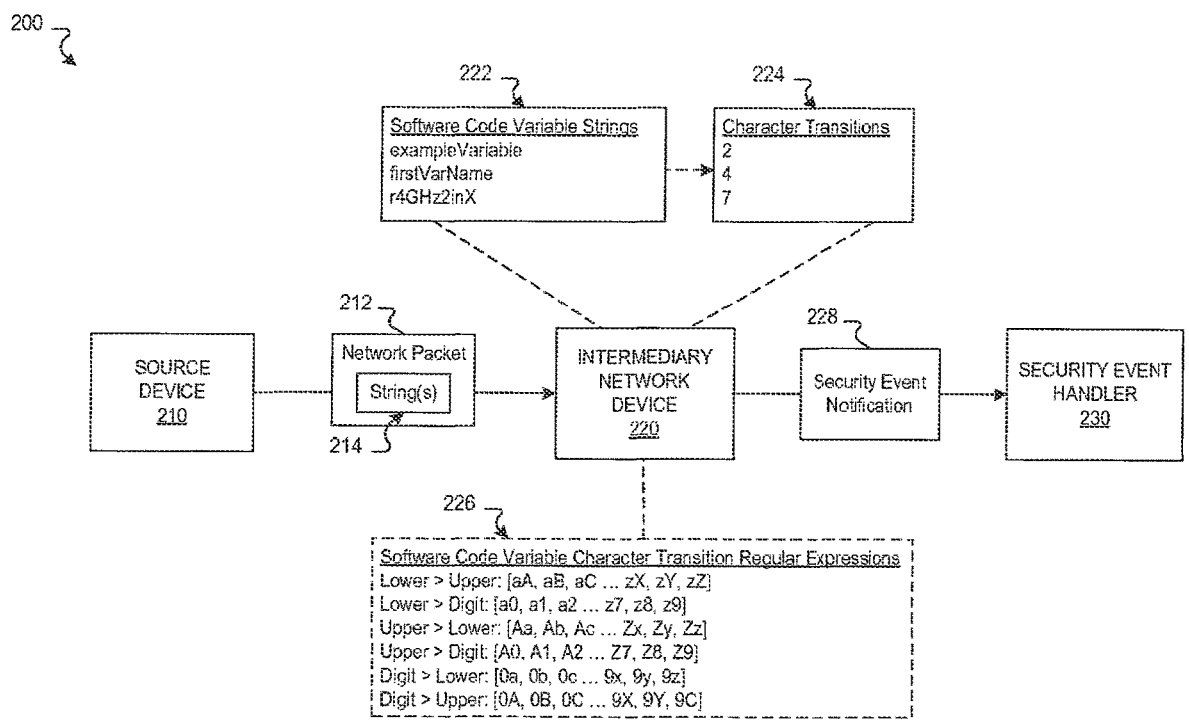
FIG. 2 is an example data flow for identifying randomly generated character strings.

FIG. 2 is an example data flow 200 for identifying randomly generated character strings. The data flow 200 depicts in-line random string detection using an intermediary network device 220, which may be implemented by a computing device, such as the computing device 100 described above with respect to FIG. 1. The source device 210 may be any computing device suitable for network communications, such as a personal computer, mobile computer, virtual machine, server computer, additional intermediary network device, or any combination thereof. For example, the source device 210 may be a client computing device configured to perform various services and/or run various applications.

During operation, source device 210 may periodically send network packets, such as network packet 212 to the intermediary network device 220. The example network packet 212 includes one or more strings 214. The intermediary network device 220 may read some or all of the strings 214 included in the network packet 212 and perform operations designed to determine if the strings 214 are randomly generated.

In the example data flow, the intermediary network device 220 has identified three software code variable strings 222 that were included in the strings 214 of the network packet 212. The three example strings are: "exampleVariable," "firstVarName," and "r4GHz2inX."

The intermediary network device 220 analyzes the strings 222 to identify the number of character transitions 224 in each string. In this example, the intermediary network device 220 uses regular expressions 226 that are used for the software code variable string context. Each of the example regular expressions includes character bigrams that, if matched by a bigram of one of the example strings 222, indicates a character transition. Using the example regular expressions 226, the intermediary network device 220 identifies 2 character transitions in the string, "exampleVariable," 4 character transitions in the string, "firstVarName," and 7 character transitions in the string, "r4GHz2inX."

The intermediary network device 220 determines, based on the number of character transitions 224, whether any of the strings 222 were randomly generated. In implementations where the threshold is dependent on context, the threshold may depend upon the length of the string, e.g., a threshold of 5 for strings less than 10 characters, a threshold of 6 for strings between 10 and 13 characters, a threshold of 7 for strings between 14 and 16 characters, and so on. Using an example threshold of 5 character transitions, the intermediary network device 220 may determine that the strings, "exampleVariable," and, "firstVarName," are not randomly generated, while the string, "r4GHz2inX," is randomly generated.

In the example data flow 200, the intermediary network device 220 produces a security event notification 228 in response to determining that the string, "r4GHz2inX," is randomly generated. The security event notification 228 is provided to a security event handler 230 for processing. The security event notification 228 may include a variety of data, such as the random string, other strings included in the network packet 212, the entire network packet 212, a stream of network packets in which the network packet 212 is included, and/or other related information and network packets. In situations where no random string is identified, the intermediary network device 220 may forward the network packet 212 to its intended destination, e.g., without generating a security event notification.

Figure 3:
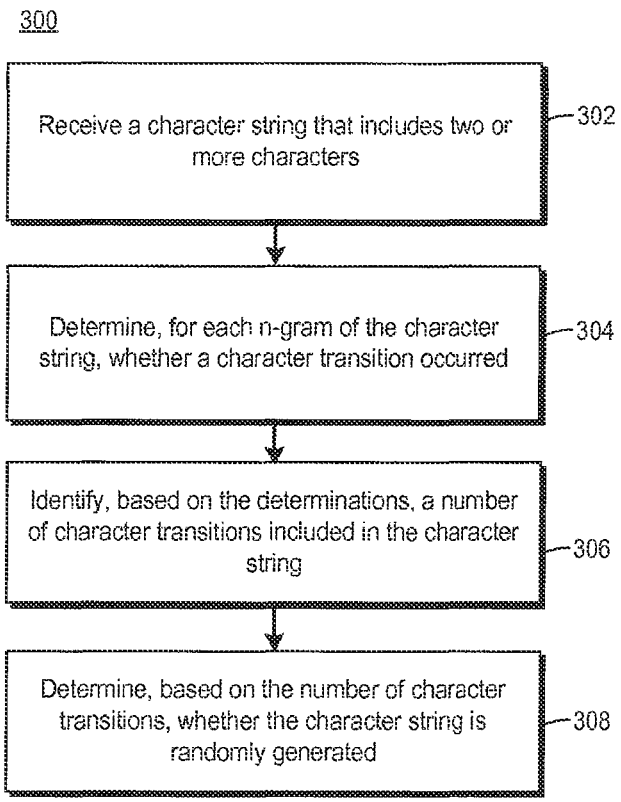
FIG. 3 is a flowchart of an example method for identifying randomly generated character strings.

FIG. 3 is a flowchart of an example method 300 for identifying randomly generated character strings. The method 300 may be performed by a computing device, such as a computing device described in FIG. 1. Other computing devices may also be used to execute method 300. Method 300 may be implemented in the form of executable instructions stored on a machine-readable storage medium, such as the storage medium 120, and/or in the form of electronic circuitry, such as a field-programmable gate array (FPGA) and/or an application-specific integrated circuit (ASIC). Combinations of one or more of the foregoing processors may also be used to identify randomly generated character strings.

A character string that includes two or more characters is received (302). For example, a network packet associated with an e-mail may include a string representing a host name for an e-mail server, such as the string, "host123.com."

For each n-gram of the character string, whether a character transition has occurred is determined (304). Each character transition is a change in character type, and n is a positive integer. For example, when using bigrams, a character transition may be determined based on a change from a lower case letter to a numerical digit, e.g., "t1." As noted above, a regular expression may be used to determine which character pairs—in the case of bigrams—include a character transition.

Based on the determinations, a number of character transitions included in the character string is identified (306). For example, a count of character transitions may be kept while determining which n-grams in the string include a character transition. Using the example string, "host123.com," 3 transitions may be identified: "t1," "3.," and ".c." In some implementations, the host computer name context may ignore certain punctuation marks, such as periods, by either parsing the name so it does not include the period or not including regular expressions that do not include a period.

Based on the number of character transitions, a determination is made as to whether the character string is randomly generated (308). This determination may, in some implementations, depend upon context associated with the string. An example string context may be: a domain name—including parts of a domain, such as top level domain and/or subdomain, a universal resource locator, security certificate metadata, file name, executable file header, software code variable name, software code function name, host computer name, electronic mail metadata, and HTTP header metadata. For example, in the context of e-mail hostnames, a relatively low number of transitions may be used as a threshold. For an 11-character string, such as "host123.com," the threshold may be 4, which is not met by the example string.

Action(s) taken in response to determining whether the string is randomly generated may vary, e.g., depending on the context. As noted above, positive determinations may provide indications of malware, and cause generation of a security event notification to notify a security event handler to manage the potential problem. For example, if a randomly generated e-mail host name is detected, offending network traffic may be blocked and/or logged for later analysis.

A variety of options are available for configuring the manner in which a computing device identifies randomly generated strings and action(s) taken in response to the determinations. The determinations and action(s) taken may depend on the context of the strings, which may also vary. In addition, a computing device implementing the method 300 may be deployed in-line, e.g., analyzing network traffic as it flows through a network, and/or out-of-line, e.g., by a computing device designed to perform analytics on previously gathered data.

The foregoing disclosure describes a number of example implementations for identifying randomly generated character strings. As detailed above, examples provide a mechanism for identifying random strings by counting character type transitions and potential applications of a system that is capable of identifying randomly generated character strings.

We claim:

1. A non-transitory machine-readable storage medium encoded with instructions executable by a hardware processor of a computing device for identifying randomly generated character strings, the machine-readable storage medium comprising instructions to cause the hardware processor to:
receive a character string that includes two or more characters;
identify a number of character transitions included in the character string, each character transition being a change in character type within an n-gram of the character string, where n is a positive integer;
identify a context associated with the character string;
determine, based on the number of character transitions and based on the context associated with the character string, whether the character string was randomly generated; and
produce a security event notification in response to determining that the character string was randomly generated,
wherein whether the character string was randomly generated is determined by comparing the number of character transitions included in the character string to a transition threshold, and the transition threshold depends on the context associated with the character string.

2. The storage medium of claim 1, wherein the context associated with the character string is one of a plurality of string contexts, the plurality of string contexts including at least two of:
a domain name;
a universal resource locator;
security certificate metadata;
file name;
executable file header;
software code variable name;
software code function name;
host computer name;
electronic mail metadata; and
HTTP header metadata.

3. The storage medium of claim 1, wherein each character of the character string has one of a plurality of character types, the plurality of character types including at least two of:
lower case alphabetical character;
upper case alphabetical character;
numerical digit;
punctuation;
symbol;
foreign language character; and
non-printable character.

4. The storage medium of claim 1, wherein:
the computing device is an intermediary network device;
the character string is included in a network packet passing through the intermediary network device; and
each character transition is identified based on a match of characters included in a particular n-gram of the character string with a regular expression that specifies character transitions.

5. A computing device for determining string similarity, the computing device comprising:
a hardware processor; and
a data storage device storing instructions that, when executed by the hardware processor, cause the hardware processor to:
receive, from network traffic of a computer network, a character string that includes two or more characters;
identify a number of character transitions included in the character string by determining, for each n-gram of the character string, whether a character transition occurred, each character transition being a change in character type, and wherein n is a positive integer;
identify a context associated with the character string;
determine, based on the number of character transitions and based on the context associated with the character string, whether the character string was randomly generated; and produce a security event notification in response to determining that the character string was randomly generated, wherein whether the character string was randomly generated is determined by comparing the number of character transitions included in the character string to a transition threshold, and the transition threshold depends on the context associated with the character string.

6. A method for identifying randomly generated character strings, implemented by a hardware processor, the method comprising:

receiving, from network traffic of a computer network, a character string that includes two or more characters;

determining, for each n-gram of the character string, whether a character transition occurred, each character transition being a change in character type, and wherein n is a positive integer;

identifying, based on the determinations, a number of character transitions included in the character string;

identifying a context associated with the character string;

determining, based on the number of character transitions and based on the context associated with the character string, whether the character string was randomly generated; and producing a security event notification in response to determining that the character string was randomly generated, wherein whether the character string was randomly generated is determined by comparing the number of character transitions included in the character string to a transition threshold, and the transition threshold depends on the context associated with the character string.

7. The method of claim 6, wherein the context associated with the character string is one of a plurality of string contexts, the plurality of string contexts including at least two of:

a domain name;
a universal resource locator;
security certificate metadata;
file name;
executable file header;
software code variable name;
software code function name;
host computer name;
electronic mail metadata; and
HTTP header metadata.

* * * * *